US009574868B2

(12) United States Patent
Shaked et al.

(10) Patent No.: US 9,574,868 B2
(45) Date of Patent: Feb. 21, 2017

(54) PORTABLE INTERFEROMETRIC DEVICE

(71) Applicant: RAMOT AT TEL-AVIV UNIVERSITY LTD., Tel Aviv (IL)

(72) Inventors: Natan Tzvi Shaked, Rishon Lezion (IL); Pinhas Girshovitz, Beer Sheva (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 72 days.

(21) Appl. No.: 14/386,031

(22) PCT Filed: Mar. 14, 2013

(86) PCT No.: PCT/IL2013/050241
§ 371 (c)(1),
(2) Date: Sep. 18, 2014

(87) PCT Pub. No.: WO2013/140396
PCT Pub. Date: Sep. 26, 2013

(65) Prior Publication Data
US 2015/0049343 A1 Feb. 19, 2015

Related U.S. Application Data

(60) Provisional application No. 61/736,289, filed on Dec. 12, 2012, provisional application No. 61/613,725, filed on Mar. 21, 2012.

(51) Int. Cl.
*G01B 11/02* (2006.01)
*G01B 9/02* (2006.01)
(Continued)

(52) U.S. Cl.
CPC ....... *G01B 9/02049* (2013.01); *G01B 9/02024* (2013.01); *G01B 9/02032* (2013.01);
(Continued)

(58) Field of Classification Search
CPC ............ G01B 9/02049; G01B 9/02024; G01B 9/02032; G01B 9/02057; G01B 9/02075; G01B 9/02097; G01B 9/04; G01B 9/02038; G01B 11/06; G02B 21/0016; G02B 21/0088
(Continued)

(56) References Cited

U.S. PATENT DOCUMENTS 5,841,125 A     11/1998  Livingston
6,266,147 B1 *   7/2001  Naulleau ............ G01B 9/02024
                                                      356/515
(Continued)

OTHER PUBLICATIONS

Guo, R., et al. "Reflective point-diffraction microscopic interferometer with long-term stability", Chinese Optics Letters, 9(12): 120002-1-120002-3. XP055219412 (2011).
(Continued)

*Primary Examiner* — Tarifur Chowdhury
*Assistant Examiner* — Jonathon Cook
(74) *Attorney, Agent, or Firm* — Browdy and Neimark, PLLC

(57) ABSTRACT

The present invention provides a novel simple, portable, compact and inexpensive approach for interferometric optical thickness measurements that can be easily incorporated into an existing microscope (or other imaging systems) with existing cameras. According to the invention, the interferometric device provides a substantially stable, easy to align common path interferometric geometry, while eliminating a need for controllably changing the optical path of the beam. To this end, the inexpensive and easy to align interferometric device of the invention is configured such that it applies the principles of the interferometric measurements to a sample beam only, being a single input into the interferometric device.

7 Claims, 8 Drawing Sheets

(51) Int. Cl.
G02B 21/00 (2006.01)
G01B 11/06 (2006.01)
G01B 9/04 (2006.01)

(52) U.S. Cl.
CPC ..... *G01B 9/02057* (2013.01); *G01B 9/02075* (2013.01); *G01B 9/02097* (2013.01); *G01B 9/04* (2013.01); *G01B 11/06* (2013.01); *G02B 21/0016* (2013.01); *G02B 21/0088* (2013.01); *G01B 2290/50* (2013.01)

(58) Field of Classification Search
USPC ....................................................... 356/503
See application file for complete search history.

(56) References Cited

U.S. PATENT DOCUMENTS

2011/0242543 A1  10/2011  Wax et al.
2013/0003073 A1  1/2013  Yu et al.

OTHER PUBLICATIONS

Bhaduri, B., et al. "Diffraction phase microscopy with white light", Optics Letters, 37(6): 1094-1096. XP001574573 (2012).

Gau, P., et al. "Parallel two-step phase shifting point-diffraction interferometry for microscopy based on a pair of cube beamsplitters", Optics Express, 19(3): 1930-1935. XP055219411 (2011).

European Search Report dated Oct. 21, 2015, in corresponding application No. EP13764790.

Shaked, Natan T. et al. "Reflective interferometric chamber for quantitative phase imaging of biological sample dynamics", Journal of Biomedical Optics Letters. 15:3: 030503-1-030503-3 (May/Jun. 2010).

Popescu, Gabriel et al. "Diffraction phase microscopy for quantifying cell structure and dynamics", Optics Letters, 31:6: 775-777 (Mar. 2006).

Ding, Huafeng et al "Instantaneous spatial light interference microscopy", Optics Express, 18:2: 1569-1575 (Jan. 2010).

Jang, Jaeduck et al. "Self-reference quantitative phase microscopy for microfluidic devices", Optics Letters, 35:4: 514-516. (Feb. 2010).

Kemper Bjorn et al "Simplified approach for quantitative digital holographic phase contrast imaging of living cells", Journal of Biomed Optics, 16:2: 026014-1-026014-4. (Feb. 2011).

Shaked, Natan T. et al "Quantitative microscopy and nanoscopy of sickle red blood cells performed by wide field digital interferometry", Journal of Biomedical Optics, 16:3: 030506-1-030506-3 (Apr. 2011).

Mico, Vincente et al "Common-path phase-shifting digital holographic microscopy: a way to quantitative phase imaging and superresolution", Optics Communications, 281:17: 4273-4281 (Apr. 2008).

Mico, Vicente et al "Common-path phase-shifting lensless holographic microscopy", Optics Letters, 35:23: 3919-3921 (Oct. 2010).

Bon, Pierre et al "Quadriwave lateral shearing interferometry for quantitative phase microscopy of living cells", Optics Express, 17:15: 13080-13094. (Jul. 2009).

Lee, Myungjun et al. "Field-portable reflection and transmission microscopy based on lensless holography", Biomedical Optics Express, 2:9: 2721-2730 (Sep. 2011).

Kolman, Pavel et al "Coherence-controlled holographic microscope", Optics Express, 18:21: 21990-22003 (Oct. 2010).

Monemhaghdoust et al. "Dual wavelength full field imaging in low coherence digital holographic microscopy", Optics Express, 19:24: 24005-24022 (Nov. 2011).

Wang, Zhuo et al "Spatial light interference microscopy (SLIM)", Optical Express, 19:2: 1016-1026 (Jan. 2011).

Shaked, Natan T. et al. "Parallel on-axis holographic phase microscopy of biological cells and unicellular microorganism dynamics" Applied Optics, 49:15: 2872-2878 (May 2010).

Shock, Itay et al. "Optical phase measurements in red blood cells using low-coherence spectroscopy", Journal of Biomedical Optics, 17:10: 101509-1-10509-5 (Oct. 2012).

International search report, dated Jun. 11, 2013. In corresponding application No. 2013050241.

* cited by examiner

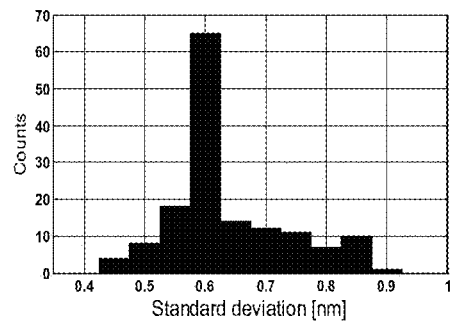 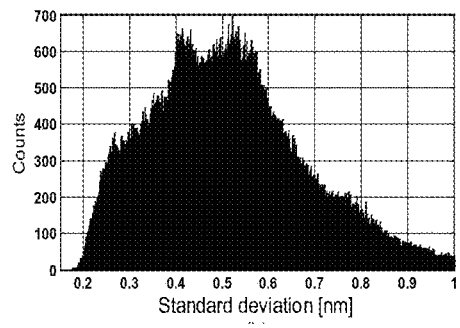
Fig. 6A             Fig. 6B
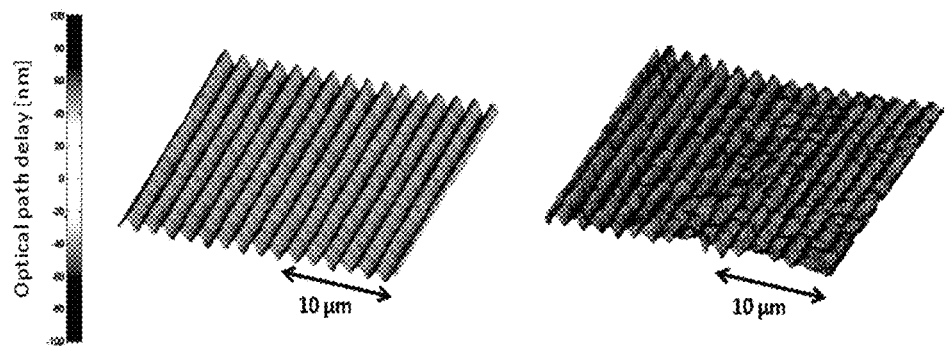
Fig. 7A             Fig. 7B
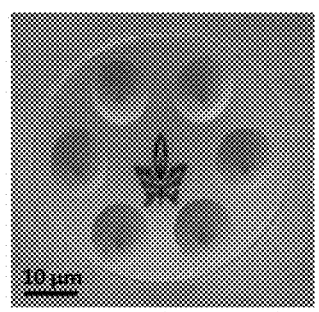
Fig. 8

PORTABLE INTERFEROMETRIC DEVICE

REFERENCES

The following is a list of publications that might be pertinent for understanding the background of the technology to which the invention relates:
1. N. T. Shaked, Y. Zhu, N. Badie, N. Bursac, and A. Wax, J. of Biomed. Opt. Lett. 15, 030503 (2010).
2. G. Popescu, T. Ikeda, R. R. Dasari, and M. S. Feld, Opt. Lett. 31, 775 (2006).
3. H. Ding and G. Popescu, Opt. Express 18, 1569 (2010).
4. J. Jang, C. Y. Bae, J.-K. Park, and J. C. Ye, Opt. Lett. 35, 514 (2010).
5. B. Kemper, A. Vollmer, C. E. Rommel, J. Schnekenburger, and G. von Bally, J. Biomed. Opt. 16, 026014 (2011).
6. N. T. Shaked, L. L. Satterwhite, G. A. Truskey, M. J. Telen, and A. Wax, "Quantitative microscopy and nanoscopy of sickle red blood cells performed by wide field digital interferometry," J. Biomed. Opt. 16, 030506 (2011).
7. V. Mico, Z. Zalevsky, and J. García, "Common-path phase-shifting digital holographic microscopy: a way to quantitative phase imaging and superresolution," Opt. Commun. 281, 4273-4281 (2008).
8. V. Micó and J. García, "Common-path phase-shifting lensless holographic microscopy," Opt. Lett. 35, 3919-3921 (2010).
9. P. Bon, G. Maucort, B. Wattellier, and S. Monneret, "Quadriwave lateral shearing interferometry for quantitative phase microscopy of living cells," Opt. Express 17, 13080-13094 (2009).
10. M. Lee, O. Yaglidere, and A. Ozcan, "Field-portable reflection and transmission microscopy based on lensless holography," Biomed. Opt. Express 2, 2721-2730 (2011).
11. P. Kolman and R. Chmelík, "Coherence-controlled holographic microscope," Opt. Express 18, 21990-22003 (2010).
12. Z. Monemhaghdoust, F. Montfort, Y. Emery, C. Depeursinge, and C. Moser, "Dual wavelength full field imaging in low coherence digital holographic microscopy," Opt. Express 19, 24005-24022 (2011).
13. Z. Wang, L. J. Millet, M. Mir, H. Ding, S. Unarunotai, J. A. Rogers, M. U. Gillette, and G. Popescu, "Spatial light interference microscopy (SLIM)," Opt. Express 19, 1016-1026 (2011).
14. N. T. Shaked, T. M. Newpher, M. D. Ehlers, and A. Wax, "Parallel on-axis holographic phase microscopy of biological cells and unicellular microorganism dynamics," App. Opt. 49, 2872-2878 (2010).

FIELD AND BACKGROUND

This invention is generally in the field of interferometry, and relates to a system and method for interferometric measurements used for inspecting samples. The invention can be particularly used with a microscope or other imaging systems to acquire quantitative inspection of transparent, semi-transparent or reflective samples.

Interferometric microscopy, also known as wide-field interferometric phase microscopy (IPM) or digital holographic microscopy can be used to simultaneously record the quantitative spatial profiles of both the amplitude and the phase of the measured samples. Using interferometric microscopy, time recording of the phase profile can yield remarkable optical thickness or optical-path-delay stability of less than a nanometer, with acquisition rates of several thousands of full frames per second, and without the need for using contrast agents such as florescence dyes. As the technique provides the optical thickness per each spatial point on the sample, various relevant morphological and mechanical parameters of the sample can be obtained in a non-contact, label-free manner IPM can be utilized for a wide range of applications including biological cells investigations, surface measurements, biometry, and others. IPM uses interference to record the complex wave front (amplitude and phase) of the light interacted with the sample. For biological and medical applications, the ability to record the sample quantitative phase enables the user to see cells and organisms, which are otherwise transparent due to the cell low absorption and scattering of the transmitted light.

These unique advantages could be attractive for many clinical applications, so many IPM setups were presented over the years, and they can be divided into various groups, such as setups that use common-path geometry [7-9] or separated reference and sample beam geometry [10], setups that use high-coherence source [6] or low-coherence source [11-13], setups that use on-axis (inline) geometry or off-axis geometry [4, 5, 10-14]. However, not many options are available for commercial interferometric microscopes compared to other microscopy techniques, and this tool is mostly used by optical and biomedical engineers for research purposes. One reason for this is the difficulty to obtain high-quality and stable interference pattern with modest and portable equipment and without the need for an expert user. The commonly-used interferometric setups are usually constructed in open and custom-built microscopes and operated by a user with knowledge in optics. To ensure the stability of the interference pattern, the entire system is positioned on an optical table to avoid mechanical vibrations and is boxed inside an enclosure to avoid differential air perturbations between the interferometric arms.

Techniques aimed at or enabling higher stability of the interference pattern with compact and portable designs have been developed. One of these systems is the interferometric chamber (InCh) microscope [1]. In this system, all the interferometric elements are encapsulated into a single, rigid and factory-designed reflective chamber. Although this system uses common-path geometry (and thus can operate without an optical table), it can still create off-axis interferograms of the sample (and thus only one frame is required for acquiring the amplitude and the phase profiles of the sample, which is suitable for highly dynamic samples). However, the InCh microscope cannot use high magnifications due to the fact that the microscope objective needs to collect the tilted reference beam. In addition, this microscope requires highly-coherent illumination sources since the optical path difference between the reference and the sample beams are twice the optical thickness of the chamber. A similar technique is described in US 2011/0242543. The system includes a light source for generating an illumination beam that propagates towards a sample. A sample holder may hold the sample and include a partially reflective cover for allowing a first portion of the illumination beam to pass therethrough to interact with the sample to produce a sample beam that propagates substantially along an optical axis. The cover may be oriented at an angle for reflecting a second portion of the illumination beam to produce a reference beam that propagates at a predetermined angle with respect to the optical axis. An imaging module may redirect the reference beam towards the optical axis at a detection plane.

A detector may intercept the sample and reference beams and may generate a holographic representation of the sample based on the beams.

Other setups for common-path or self-interference interferometry have been presented [2-5]. In one type of setups, a diffraction grating or other specialized optical elements are used, whereas in another type of setups, a Michelson interferometer in the output of a microscope is used, so that the sample beam interferes with itself, with the limitation that half of the sample has to be empty. Many of the known interferometric setups, however, have the same main drawbacks of bulkiness, non-portability and the requirement for specific optical skills to align and use them. These shortcomings cause this technology to largely remain in optical research laboratories, and thus it is not very common in the industry or in clinics.

GENERAL DESCRIPTION

There is a need in the art for a novel interferometric device which eliminates or at least significantly reduces the sensitivity of the interferometric measurements to the effects of environmental conditions, such as mechanical vibrations and air perturbations to which the interferometer is typically exposed. Also, there is a need in the field of interferometric measurements to increase the sensitivity of the measurements by using low-coherence light sources. In addition, there is a need in the art for providing a portable and inexpensive interferometric module for microscopes or other imaging systems that can be connected in their output, turning them to powerful interferometric imaging systems with the modest equipment and without the need of optics knowledge, which will provide, for example, a device of acquiring live biological cells in a label-free manner with sub-nanometric thickness precision or quality testing of elements with nanometer scale thicknesses after their production, or even assuring their production (for example, for controlling a lithography process).

The present invention provides a novel approach for interferometric measurements that solves the above problems and can be easily incorporated in a microscope (or other imaging systems). According to the invention, the interferometric device provides a substantially common path for the sample and reference beams while eliminating a need for controllably changing the optical path of the reference beam. To this end, the interferometric device of the invention is configured such that it applies the principles of the interferometric measurements to a "sample" beam only, being a single input into the interferometric device. In other words, in the invention, a beam that is split into sample and reference beams is the beam that has interacted with a sample. Such input beam into the interferometric device of the invention may be provided as the output of a regular microscope, usually propagating towards the detector of the microscope. Thus, the interferometric device of the invention may be installed in an optical path of light propagating from the sample through the optical system detector. The sampled beam, after its interaction with the sample is amplitude and phase modulated by the sample and then the beam propagates into the interferometric device, where it is split into a pair of beams and combined again. Then, the beams propagate to the light detector (such as a microscope camera) where they interact and produce the interference pattern, while one of these beams, on its way to the detector, undergoes optical processing to remove the sample modulation and which beam will thus present a reference beam. This optical processing is spatial filtering and is implemented by the passage of the beam through two lenses and being reflected by a mirror located behind a pinhole. This mirror-pinhole construction is located in a Fourier plane with respect to the sample plane of the imaging system. The beam interacting with a pinhole in the Fourier plane results in filtering out of all the non-zero spatial frequencies of the beam. This configuration in which the mirror is located behind a pinhole enables to provide a high stability and a low noise. This configuration also enables to simplify the alignment of the interferometer.

As described above, the interferometric device of the present invention can be attached to the camera port of a conventional microscope or other imaging systems, while still obtaining high-quantity interferograms of the samples without the need for special optical skills or complicated alignment prior to the experiment. Since the light splits and merges only after the output of the microscope, while using spatial filtering to erase the information from one of the beams before it merges with the other beam, this setup can be considered as a common-path interferometer, and thus it is more stable compared to regular interferometers. In addition, this setup can be easily adjusted with a low-coherence light source, which creates clearer images with less coherent noise. In contrast to regular interferometers, since there is only one sample beam till the output of the microscope, the user does not need to take into consideration the thickness of the constant sample elements such as the cover-slips in order to create beam path matching for achieving interference with a low-coherence source. Due to these advantages, this setup achieved a low temporal and spatial noise levels in the sub-nanometric range.

Thus, according to one broad aspect of the invention, there is provided an interferometric device comprising a light-directing optical arrangement for directing light to an optical detector, wherein the light directing optical arrangement is configured for defining first and second substantially overlapping optical paths towards the optical detector, the light directing optical arrangement comprises: a beam splitter/combiner unit for receiving an input beam of the amplitude and phase modulation and splitting the input beams into first and second light beams, a first and second reflective surfaces accommodated in the first and second optical paths of the first and second light beams split by the beam splitter/combiner to thereby direct the first and second light beams back to the beam splitter/combiner that directs the combined beam to the detector; a spatial filter comprises, a pinhole accommodated in front of at one of the first and second reflective surfaces and a Fourier optics assembly comprising two lenses, one being in a 4f configuration with respect to each other, the light directing optical arrangement directing first and second optical beams along the first and second paths thereby enabling interaction between the first and second beams at the optical detector, an interference pattern resulting from the interaction of the first and second optical beams being thereby indicative of the amplitude and phase modulation, the beam splitter/combiner unit directing one of the first and second light beams through the spatial filter to enable amplitude and phase demodulation thereof and formation of a reference beam with respect to the other modulated beam.

The pinhole is located in a predetermined Fourier plane (e.g. that of the surface being imaged).

In some embodiments, one of the first and second reflective surfaces comprises a retro-reflector. The retro-reflector may be built out of two mirrors connected in a right angle, which tilts sample beam, so that an off-axis angle can be created between the sample and reference beams. By using this configuration, the interferometer of the present invention is configured to operate in off-axis geometry. It should be noted that the on-axis geometry might limit the capture of dynamic changes as more than a single exposure is needed to obtain the quantitative phase profile of the sample [12], while the sample might change between the frames of acquisitions. In addition, complex elements, such as phase modulators, may be used to create the needed different exposures. The present invention also provides an off-axis interferometer operating in full off-axis geometry, enabling to obtain an interference on a large field of view (limited only by the coherence length of the source) and using the full frame rate of the camera, while still retaining the advantages of the device portability, low cost, easy construction and alignment, even with a low-coherence source.

The off-axis configuration of the interferometer of the present invention presents a new simple-to-align, highly-portable interferometer, which is able to capture wide-field, off-axis interference patterns from transparent samples under low-coherence illumination. This small-dimension and low-cost device can be connected to the output of any microscope illuminated by a low-coherence source and yield sub-nanometric optical thickness measurements in a label-free manner. The interference fringes have high spatial frequency, and the interference area is limited only by the coherence length of the source, and thus it enables to obtain high-resolution quantitative images of static and dynamic samples.

In some embodiments, the beam splitter/combiner unit comprises a cube beam splitter.

In some embodiments, the first and second reflective surfaces are placed right at the outputs of the beam splitter/combiner unit.

In some embodiments, one lens is located at a distance equals to its focal length from the image plane of the imaging system.

In some embodiments, one of the reflective surfaces is located after one of the lenses at a distance of the focal length of the lens.

In some embodiments, the detector is located at a distance of the focal length of one of the lens.

In some embodiments, the interferometer device comprises a phase shifting device into one of the beam paths.

According to yet another broad aspect of the invention, there is provided an optical system comprising: a beam splitter/combiner unit for receiving an input beam of certain amplitude and phase modulation and splitting the input beam into first and second light beams of the same amplitude and phase modulation and combining reflections of the first and second light beams to produce an output combined beam; a first and second reflective surfaces accommodated in the first and second optical paths of the first and second light beams to thereby direct the first and second light beams back to the beam splitter/combiner that directs the combined to the detector; a spatial filter comprising a pinhole accommodated in front of the first mirror in the optical path of the first split light beam to apply amplitude and phase demodulation thereto and thereby form a demodulated reference beam with respect to the second modulated beam and a Fourier optics assembly comprising two lenses, one being in a 4f configuration with respect to each other; thereby enabling an interference pattern resulting from interaction of the reference and modulated beams to be indicative of the amplitude and phase modulation.

According to yet further broad aspect of the invention, there is provided a sample inspection system, comprising: light collecting and focusing optics configured and operable for collecting an input beam from a predetermined sample surface and focusing it onto an image plane; an interferometer unit accommodated in a path of the light collected by the light collecting and focusing optics, the intereferometer unit comprising: a beam splitter/combiner unit for receiving the input beam of certain amplitude and phase modulation and splitting the input beam into first and second light beams of the same amplitude and phase modulation and combining reflections of the first and second light beams to produce an output combined beam; a first and second reflective surfaces accommodated in the first and second optical paths of the first and second light beams to thereby direct the first and second light beams back to the beam splitter/combiner that directs the combined to the detector; a spatial filter comprising a pinhole accommodated in front of the first mirror in the optical path of the first split light beam being located in a Fourier plane with respect to the predetermined surface to thereby apply amplitude and phase demodulation thereto and form a demodulated reference beam with respect to the second modulated beam and a Fourier optics assembly comprising two lenses, and a second lens being positioned in an 4f configuration with the first lens; an interference pattern resulting from interaction of the reference and modulated beams in the image plane being thereby indicative of the amplitude and phase modulation.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIGS. 6A-6B are spatial and temporal optical-path-delay profiles (OPDs) in a dry sample (OPDs) respectively; FIG. 6A represents an OPD standard deviation across an image for 150 OPD images (spatial sensitivity) and FIG. 6B represents an OPD standard deviation between 150 OPD images on each diffraction-limited spot (temporal sensitivity);

FIGS. 7A-7B are optical-path-delay or optical thickness maps of a volume phase holographic grating obtained under low-coherence illumination by the off-axis interferometer of the present invention (FIG. 7A); and a Mach-Zehnder interferometer (FIG. 7B) respectively;

FIG. 8 is a scanning electron microscope (SEM) image of a first lithographed phase target;

DETAILED DESCRIPTION OF EMBODIMENTS

Figure 1A:
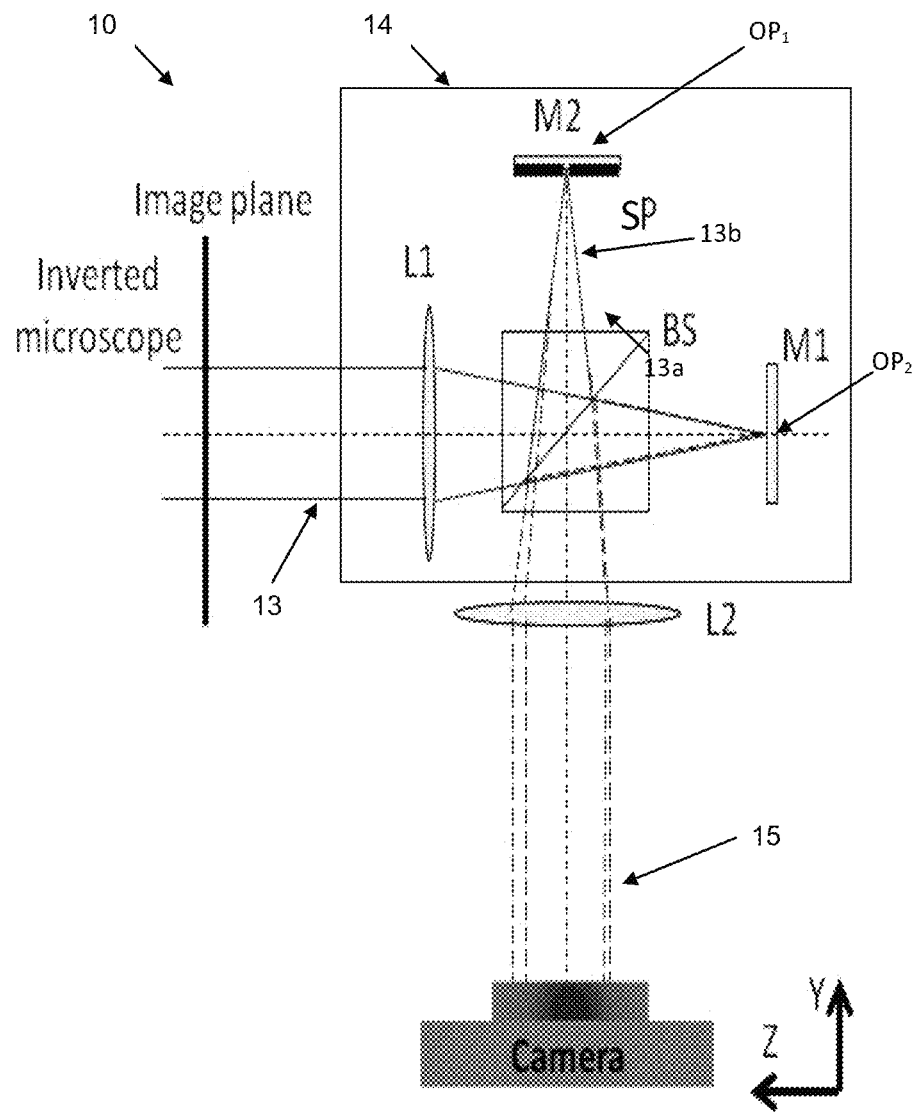
FIGS. 1A-1B are schematic figures of some possible configurations of the interferometer of the present invention, positioned in the camera port of a regular microscope.

FIG. 1A presents a system 10 including an interferometric device 14 which in the present not limiting example is incorporated in a microscope being ported into the microscope output (replacing a digital camera typically installed there in the microscope). This configuration enables to connect a regular camera at the output of the device of the present invention. A magnified image of a sample from the microscope is formed by light 13 presenting amplitude and phase modulation of an input light incident on the sample, the amplitude and phase modulation being indicative of the sample's effect on light passing therethrough. The interferometer device 14 comprises a light directing optical arrangement for receiving input light 13 of certain amplitude and phase modulation and direct the light to an optical detector (e.g. digital camera) where an interference pattern is detected being indicative of the amplitude and phase modulation. The light directing optical arrangement of the invention defines first and second substantially overlapping optical paths $OP_1$ and $OP_2$ towards the detector. These optical paths serve for propagation of first and second optical beams of substantially the same amplitude and phase modulation to thereby enable interaction between these beams at the detector to produce the interference pattern. The light directing optical arrangement 14 includes a beam splitter/combiner unit BS for receiving input beam 13 of the amplitude and phase modulation and splitting it into first and second light beams 13a and 13b, and directing one of them (beam 13b in the present example) through a spatial filter SP placed in the Fourier plane of one of the interferometric arms to enable amplitude and phase demodulation thereof and formation therefrom a reference beam with respect to the other modulated beam.

Further provided in the interferometric device 14 is a first and second reflective surfaces M1 and M2 accommodated in the first and second optical paths of the first and second light beams to direct the first and second light beams back to the beam splitter/combiner unit BS that directs the combined beam to the detector. The spatial filter SP is accommodated in front of the second mirror M2.

Further provided in the interferometric device 14 is a Fourier optics assembly configured for applying Fourier transform to an optical field of the input beam 13 and for applying inverse Fourier transform to an optical field of a combined beam 15 propagating from the beam/splitter combiner to the detector. This Fourier optics assembly is thus formed by lenses $L_1$ and $L_2$, where lens $L_1$ is located at a distance equals to its focal length from the image plane of the imaging system. Thus, the image plane in the output of the microscope is Fourier transformed by lens L1 and then splits it into first and second beams by a cube beam splitter/combiner BS. One of the beams (defined as the sample beam) is reflected by the element M1, located after lens L1 at a distance of the focal length of lens L1, and then Fourier transformed back to the camera plane using lens L2, located at a distance of the focal length of L2 from M1, and the camera is located after L2 at a distance of the focal length of L2. The other beam (defined as the reference beam) is spatially filtered by a spatial filter SP constituted by pinhole, reflected by mirror M2 located right after the pinhole, and Fourier transformed back to the camera plane by lens L2. The pinhole demodulates one of the light beam thereby erasing the sample information by only passing the zero frequencies of the image Fourier transform, thus effectively creating a reference beam with respect to the second beam, still containing the full sample information. Thus, the spatial filtering effectively creates a reference beam by erasing the sample information from one of the beams, and also increases the beam spatial coherence and enables quantitative interference on the camera. The dashed lines are directly transmitted light while the solid lines are the image forming beams. The two beams are then reflected by element M1 and mirror M2 and combined by the beam splitter/combiner. Another lens L2, positioned in 4f configuration with the first lens L2, back Fourier transforms the combined beam and projects it onto a detector, e.g. a digital camera, where an interference pattern results from interaction of the reference and modulated beams in the image plane and an interferogram of the sample is created.

By using this configuration, the two beams are on the same optical axis, causing the beams to propagate in the same direction after L2 lens. The angle between the two beams is negligible and this causes an on-axis interference pattern on the digital camera. Several phase-shifted interferograms would be required for the reconstruction process, which can be obtained by adding a phase shifting device into one of the beam paths. To reconstruct the sample profile using one interferogram, one can shift the camera to the edge of the interference pattern so that the off-axis interferogram appears on a small area where the fringes are parallel straight lines. However, this can be obtained in a very limited field of view, and thus the sample size that can be interferometrically recorded is significantly reduced.

In some embodiments, element M1 is a two-mirror construction such as a retro-reflector RR providing a novel interferometer having an off-axis configuration. This set-up will be described in detail further below with respect to FIG. 4A. The retro-reflector RR may comprise a corner reflector, a cat's eye or a phase-conjugate mirror.

Figure 1B:
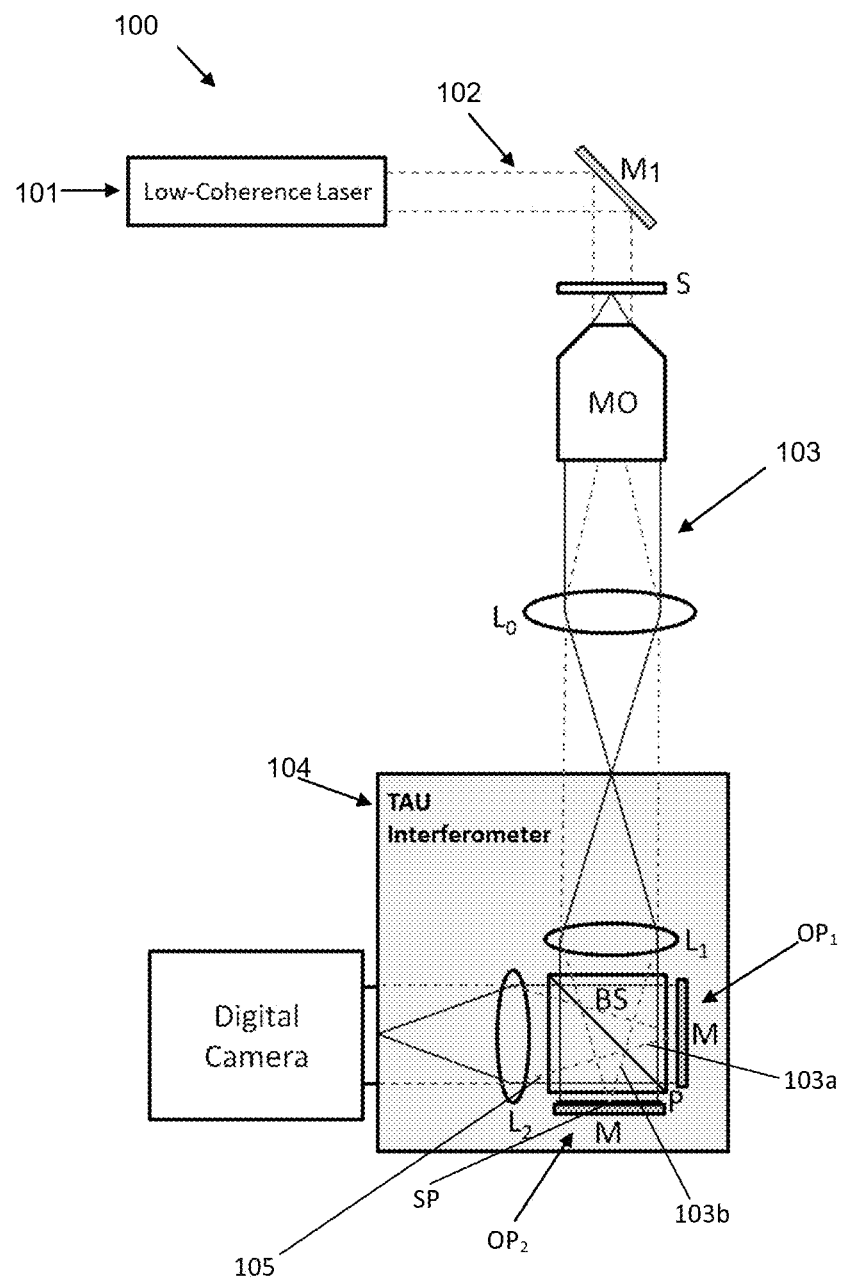

FIG. 1B presents a system 100 configured according to some embodiments of the present invention, including an interferometric device 104 which in the present not limiting example is incorporated in an microscope being ported into the microscope output (replacing a digital camera typically installed there in the microscope). The microscope includes a light source 101, such as a low-coherence laser, a sample holder S, and a microscope objective MO. Also, the microscope may include a light directing optics, such as a light deflector (mirror) M1 that directs light 102 from the light source onto a sample S, and a tube lens $L_0$. The objective lens and the tube lens create an appropriately magnified image of the illuminated spot of the sample on an image plane located in the interferometric device 104. The dashed lines are directly transmitted light while the solid lines are the image forming beams.

The interferometer 104 receives the magnified image of the sample S from the microscope. This image is formed by light 103 presenting amplitude and phase modulation of the input light 102 incident on the sample, the amplitude and phase modulation being indicative of the sample's effect on light passing therethrough. The interferometer 104 is configured according to the invention as a light directing optical arrangement for receiving input light 103 of certain amplitude and phase modulation and direct to an optical detector (e.g. digital camera) where an interference pattern is detected being indicative of the amplitude and phase modulation. The light directing optical arrangement of the invention defines first and second substantially overlapping optical paths $OP_1$ and $OP_2$ towards the detector, and comprises a spatial filter accommodated in one of the first and second optical paths.

The light directing optical arrangement 104 includes a beam splitter/combiner unit BS for receiving input beam 103 of the amplitude and phase modulation and splitting it into first and second light beams 103a and 103b, and directing one of them (beam 103b in the present example) through a spatial filter SP to enable amplitude and phase demodulation thereof and formation therefrom a reference beam with respect to the other modulated beam. Further provided in the interferometric device 104 is a Fourier optics assembly configured for applying Fourier transform to an optical field of the input beam 103 and for applying inverse Fourier transform to an optical field of a combined beam 105 propagating from the beam/splitter combiner to the detector. This Fourier optics assembly is thus formed by lenses $L_1$ and $L_2$, where lens $L_1$ is located in the image plane of the sample (i.e. the plane being imaged).

Thus, device 104 receives input amplitude and phase modulated beam 103, Fourier transforms it by lens $L_1$ and then splits it into first and second beams by a cube beam splitter/combiner BS. The two beams are then reflected by mirrors M and combined by the beam splitter/combiner. The setup provides an on-axis interferometric microscope, and an electric control connected to one of the mirrors can create several phase shifted interferograms that are needed to retrieve the quantitative phase profile of the sample. However, to enable single-exposure operation, off-axis interferograms can be acquired by shifting the mirrors M or the camera to high-spatial-frequency region, within the source coherence length.

The configuration uses simple optical elements only and no gratings or other diffractive elements are used inside the interferometer 104. It should be understood that in most IPM setups, the beam is split to the reference and sample beam before interacting with the sample and then the beams propagate through different areas with different environmental noises. In contrast, in the present invention, the beam is split after the sample interaction and therefore provides an interferometer having common-path geometry, where higher stability and lower noise is obtained. It should be noted that the input beam of the sample only splits in the end of the device, accordingly the proposed setup can be considered as a common-path interferometer, and its stability will be significantly higher compared to regular interferometers. Moreover, since splitting the beam is done in the middle of the 4f device (coincides with the center of the beam splitter/combiner), the interferometer 104 is closer to common path than other configurations in which the splitting is done in the beginning of the 4f device. Additionally, since the first and second beams, i.e. reference and sample beams, pass mostly through the glass of the cube beam splitter/combiner, there are less differential air perturbations between the interferometric arms, even if the interferometer is not boxed. It should also be noted that the mirrors in the interferometer 104 are placed right in the outputs of the beam splitter BS and since the beams are tightly focused on each of the mirrors M, it is significantly easier to match the beam paths, making it possible to obtain interference with low-coherence sources.

According to another possible embodiment of the present invention, not shown in the figures, if a microscope with condenser annulus is available (such as in phase contrast microscope), the interferometer 104 can use for the spatial filter a ring aperture instead of the pinhole P in front of one of the mirrors M.

In order to demonstrate the capabilities of the invention, the inventor performed an experiment with a device that is similar to the device illustrated in FIG. 1B with the following specifications: A temporally low-coherence plane wave was created by passing a supercontinuum fiber-laser light (from SC400-4, Fianium) through a computer-controlled acousto-optics tunable filter (SC-AOTF, Fianium), selecting a central wavelength of 633 nm with a full-width-at-half-maximum bandwidth of 6.6 nm, as measured by a compact spectrometer (USB400, Ocean Optics). This low-coherence light was collimated using relay optics and input into the microscope. In addition, for comparison, a highly-coherent source (633 nm, Helium-Neon laser) was used in the input of the microscope.

In the microscope, a 40×, 0.66 numerical-aperture microscope objective MO and a 15 cm focal-length tube lens $L_0$ were used. The interferometer 104, ported in the output of the microscope, contained two 7.5 cm focal-length lenses $L_1$ and $L_2$, positioned in 4f configuration, a cube beam splitter BS, and two mirrors M, with a pinhole P of 20 μm positioned in front of one of them. The mirrors M were positioned very close to the output of the beam splitter, so that there was almost no propagation through free space after splitting the beams and before combining them. No enclosure was used to avoid differential air perturbations between the interferometric arms. A monochrome digital camera (DCC1545M, Thorlabs) with 5.2 μm square pixels was positioned in the output of the interferometer 104 to acquire the interferograms of the sample.

100 inteferograms per second were acquired and then processed into the phase profile of the sample by using a digital spatial filtering, followed by phase unwrapping algorithm for removing 2π ambiguities. The final phase profile was obtained by subtracting the unwrapped phase profile from a sample-less interferogram, which compensates for (temporally-invariant) spatial noise. The resulting phase profile is proportional to the sample optical path delay profile.

Figure 2:
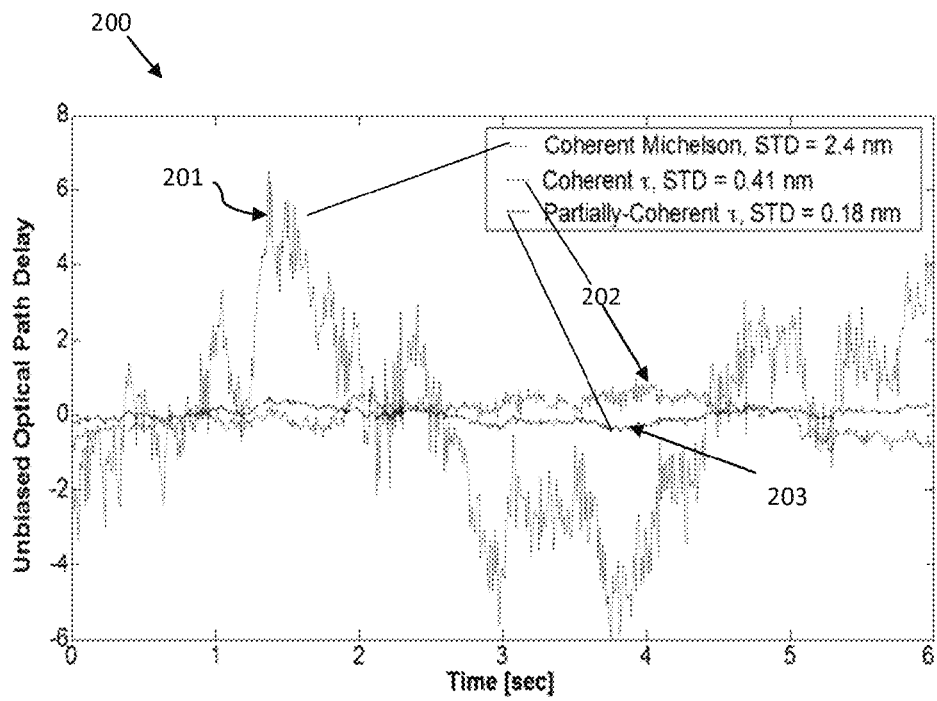
FIG. 2 is a plot showing comparative results about the temporal optical path delay between the interferometer of the present invention and a conventional Michelson interferometer.

FIG. 2 contains a plot of the unbiased optical path delay in nm against time in sec as obtained for the on-axis configuration. The dashed-line graph 202 in FIG. 2 represents the temporal optical path delay that was obtained using the interferometer 104 and the highly-coherent source for a representative diffraction-limited spot, with standard deviation of 0.41 nm. For comparison, the dotted-line graph 201 in FIG. 2 represents the temporal optical path delay that was obtained using a conventional Michelson interferometer under the same conditions (without using an enclosure) for a representative diffraction-limited spot, with a standard deviation of 2.4 nm. As shown by the solid-line graph 203 in FIG. 2, when using the low-coherence source, the interferometer 104 yielded temporal optical path delay for a representative diffraction-limited spot with standard deviation of 0.18 mm Under low-coherence illumination, spatially averaging the optical path delay profile for 100×100 diffraction-limited spots yielded a standard deviation of 0.42 nm, whereas a Michelson interferometer using the highly-coherent source yielded a spatial standard deviation of 3.8 nm, mostly due to the presence of speckle noise.

Figure 3:
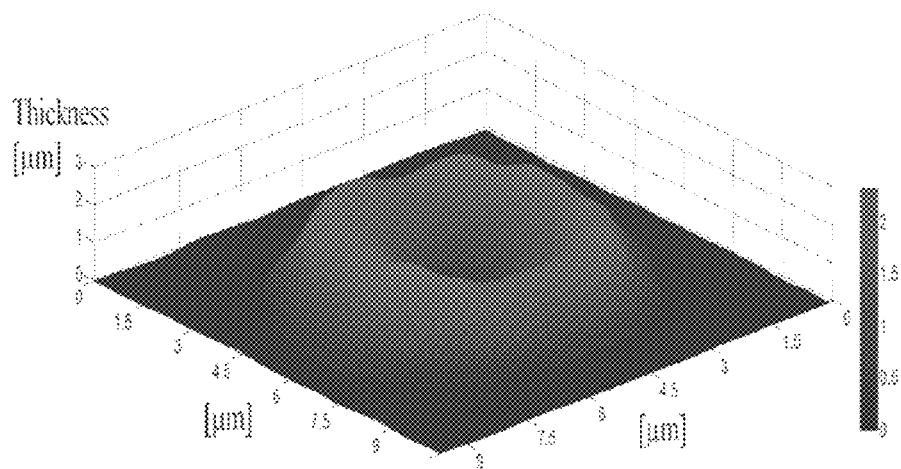
FIG. 3 is an image of a quantitative thickness profile of a live red blood cell acquired with the interferometer of the present invention.

Referring to FIG. 3, the thickness profile of a live human red blood cell obtained by a single exposure using the on-axis interferometer 104 and the low-coherence source 101 is shown. To obtain this thickness profile, the optical path delay profile of the cell was divided by the difference between the refractive index of the cell (n=1.395), under the assumption of homogenous refractive index for an enucleated red blood cell, and the refractive index of the surrounding media (n=1.34). As shown in FIG. 3, due to the use of a low-coherence source, the background around the red blood cell (containing only cell media) is remarkably flat, with a standard deviation of spatially-averaged optical path delay of 0.85 nm in liquid environment. The invention provides a simple, cost-effective technology for significantly reducing the size of the interferometer (as low as 1 inch) and increasing the interferometer measurement stability and thus its accuracy by using efficient common-path geometry.

Figure 4A:
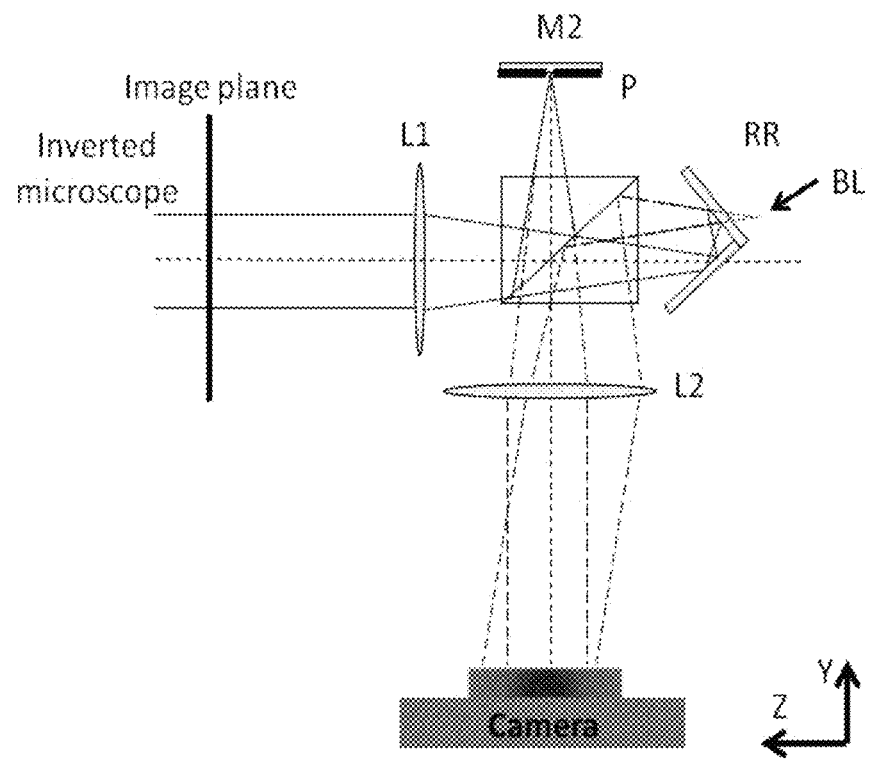
FIG. 4A is a schematic figure representing another possible configuration of the interferometer of the present invention, according to another embodiment of the present invention.
Figure 4B:
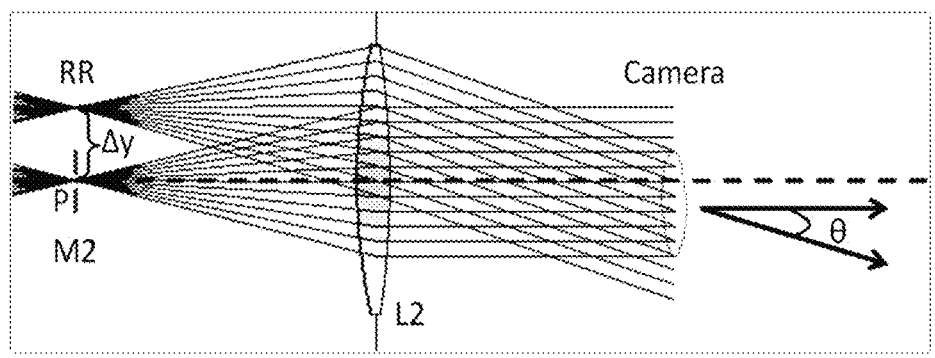
FIG. 4B is a ray tracing of the sample and the reference beams as it would be seen if they were on the same optical axis according to the embodiment of FIG. 4A.

Reference is made to FIG. 4A, illustrating another embodiment of the present invention in which the novel interferometer has an off-axis geometry capable of creating a full off-axis interference pattern on the camera. In order to create a small angle between the sample beam and the reference beam, and enable an off-axis interferogram, the actual Fourier plane center, described by the continuation of the reflected beam BL in FIG. 4A, is shifted using a retro-reflector RR. This retro-reflector may comprise a pair of mirrors attached to each other in a right angle. FIG. 4B shows the RR operation in tilting the sample beam and creating an off-axis interferometric angle on the camera. This figure presents the two beams ray tracing as it would be seen if they both were on the same optical axis (so that a beam splitter was not used in the middle of the 4f device composed of lens L1 and L2, but still the splitting would be performed).

As can be seen from this figure, the retro-reflector creates an angle θ between the beams, which is described as follows:

$$\theta = \arctan(\Delta y/f), \quad (1)$$

where θ is the angle between the reference beam and the sample beam, Δy is the shift between the focal points of the two beams, and f is the focal length of lens L2.

Figure 5:
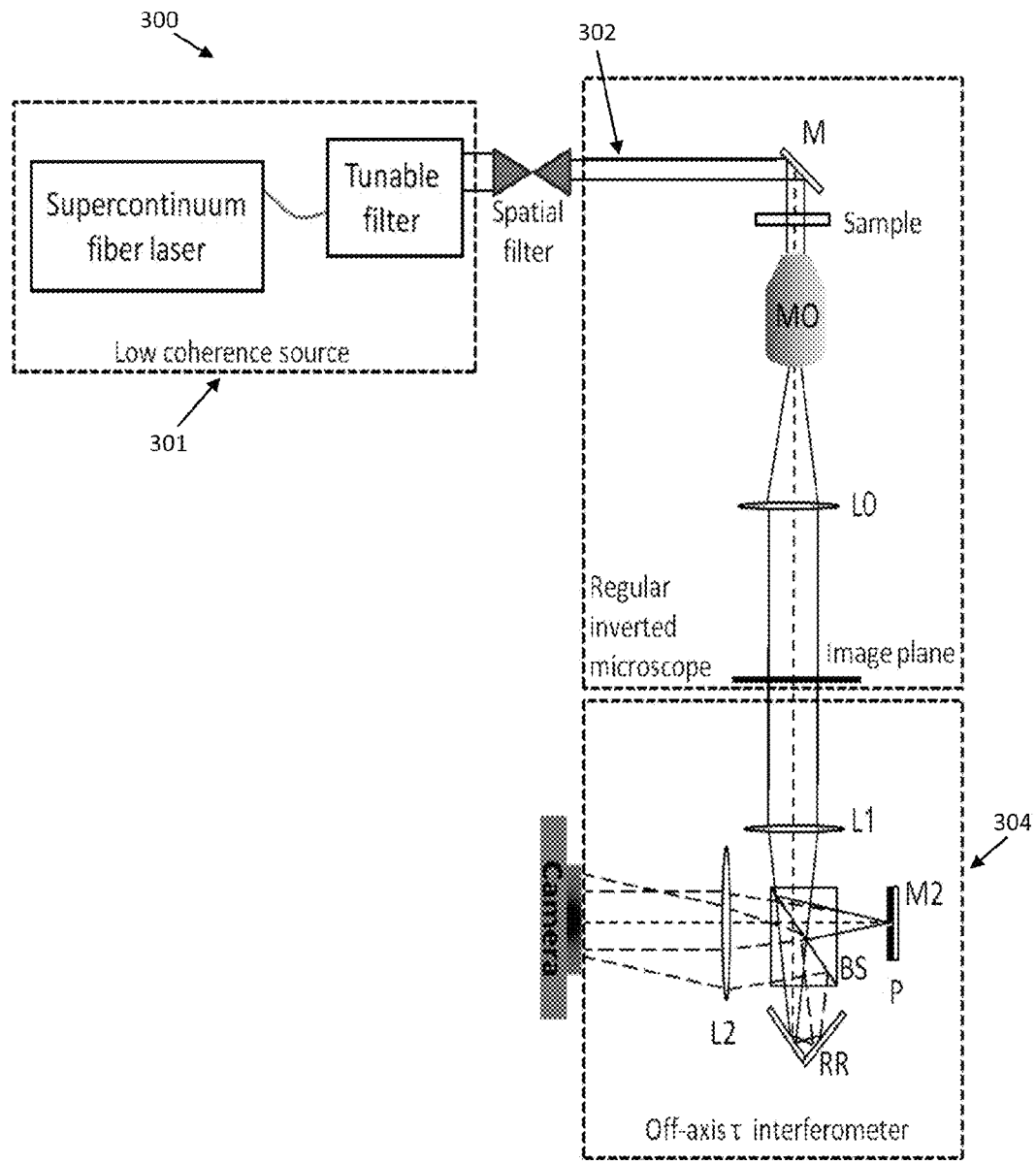
FIG. 5 is a schematic figure of the interferometer of the embodiment of FIG. 4A connected at the output of a regular microscope and illuminated by a tunable low-coherence source.

To demonstrate the operation of the off-axis interferometer of the present invention, the inventors have constructed the experimental setup illustrated in FIG. 5. FIG. 5 presents a device 300 configured according to some embodiments of the present invention, including an interferometric device 304 which in the present not limiting example is incorporated in an microscope being ported into the microscope output (replacing a digital camera typically installed there in the microscope). The microscope includes a light source 301, such as a low-coherence laser, a sample holder Sample, and a microscope objective MO. Also, the microscope may include a light directing optics, such as a light deflector (mirror) M that directs light 302 from the light source onto a sample, and a tube lens $L_0$. The objective lens and the tube lens create an appropriately magnified image of the illuminated spot of the sample on an image plane located in the interferometric device 304. The solid lines are directly transmitted light while the dashed lines are the image forming beams. In order to demonstrate the capabilities of the invention, the inventor performed an experiment with a device that is similar to the device illustrated in FIG. 5 with the following specifications: this setup contains a simple invert microscope with a single 40×, 0.66-numerical-aperture, infinity-corrected microscope objective, spherical tube lens with 15 cm focal length, and a monochromatic CMOS camera with 5.2 µm square pixels (Thorlabs DCC1545M). The off-axis interferometer 300 is connected between the microscope camera port and the digital camera in a 4f configuration. In this non-limiting example, the regular microscope is illuminated by a tunable low-coherence source 301. The light source 301 used in the input of the invert microscope is a supercontinuum fiber-laser source (SC400-4, Fianium), connected to a computer-controlled acousto-optical tunable filter (SC-AOTF, Fianium), tuned to a central wavelength of 633 nm and a full-width-at-half-maximum bandwidth of 6.7 nm, as measured by a compact spectrometer (USB4000-VIS-NIR, Ocean Optics). To collimate the beam in the output of the tunable filter and to increase its spatial coherence, the beam was spatially filtered using 10× and 5× microscope objectives and 25 µm confocally-positioned pinhole, creating magnification of 0.5. Lenses L1 and L2 were chosen to be achromatic lenses with focal lengths of 100 mm and 125 mm respectively. The total magnification of the experimental setup was 47× and the experimentally-confirmed diffraction-limited spot was 0.815 µm. The interference area on the camera sensor was 5.32 mm×5.32 mm (1024×1024 pixels of 5.2 µm each) with a high-visibility modulation area (above half of the maximum visibility) of 2.672 mm×5.32 mm (512×1024 pixels) and a fringe frequency of 48 lines per mm (fringe cycle of 4 pixels).

Based on the Fraunhofer diffraction through a circular aperture and the used optical elements in the off-axis interferometer of the present invention, for the experimental setup in FIG. 5, the pinhole diameter is chosen to be 30 µm. This pinhole size ensures that most of the sample-image data is erased and that the first airy disk defined by the pinhole covers most of the camera sensor where the interference fringes appear [7]. In the experimental setup, the camera was set on the maximum exposure time possible without reaching saturation, gamma value of 1 and no gain.

In addition to its portability, simple and inexpensive design, one of the advantages of the off-axis interferometer of the present invention is its simple alignment. Using this interferometer, obtaining interference with a high-coherence source, such as a HeNe laser, is immediate, and the alignment with a low-coherence source is significantly easier compared to obtaining low-coherence interference with conventional interferometers such as Mach-Zehnder or Michelson interferometers. The alignment of the off-axis interferometer of the present invention using a low-coherence source is done by firstly aligning the pinhole on the combined focal point of lenses L1 and L2 and obtaining a circular diffraction image on the camera plane. Following this, the retro-reflector RR is positioned in such a way that on both of its mirrors, the beam spot has the same size, while both spots appear as close as possible to the connection between the two mirrors. By doing so, the optical path delay between the two beams will be far only several millimeters from interference in an on-axis geometry. Then, RR is shifted in z direction until an interference pattern between the beams occurs. Following this, shifting RR in the y direction creates an off-axis interference pattern on the camera, with an angle determined by Eq. (1).

Since the phase of the wave reflected from the pinhole still contains the DC frequency of the original wave, caused by the constant optical thickness of parts in the entire sample (such as a cover-slip), the optical thickness in the first exponent numerator (and in the second one) lacks this constant value. This increases the fringes visibility, reduces noise, and more importantly, prevents changes in the interference area due to positioning of samples with different cover-slip thicknesses.

The following are some experimental results obtained with the device of the invention:

To estimate the off-axis configuration, spatial and temporal noise levels, which determine the optical-path-delay sensitivity across an image and between images, respectively, two different samples were recorded, one of a plain cover-slip and a second one of a chamber containing only water. For this experiment, 150 interferograms of 512×512 camera pixels were continuously recorded during 10 seconds. FIG. 6A presents the standard deviation distribution of the optical-path-delay map of 512×512 pixels for 150 interferograms for the dry sample (each value is from a different interferogram). This distribution represents the spatial sensitivity/stability of the device of the present invention indicative of the spatial noise in the optical-path-delay maps. As can be seen, most of the values are around 0.6 nm. In the center of the image (a central area of 150×150 pixels), where the visibility is higher than 0.75, the spatial stability value was only 0.35 nm. FIG. 6B shows the standard deviation distribution per a single diffraction-limited spot across the 150 optical-path-delay maps for the dry sample, representing the temporal sensitivity/stability of the device. The mean temporal stability measured was 0.5 nm, where in the center of the image it was 0.24 nm. For the wet sample, the temporal sensitivity had a mean value of 0.54 nm, whereas in the center of the image it was only 0.28 nm.

The digital phase extraction of the sample phase from the interferogram is carried out by digital spatial filtering of the off-axis interferogram, which includes a digital two-dimensional Fourier transform, separation of the $G_{+1}$ temporal coherence function from the zero-order $I_s+I_r$, and back Fourier transform of the centered $G_{+1}$ temporal coherence function. Then, the phase argument of the resulting complex function is taken to obtain the wrapped phase. Afterwards, to compensate for aberrations and field curvatures, the same wrapped-phase extraction process is performed for a sample-free interferogram, and the result is subtracted from the first wrapped phase. Finally the quality-guided two-dimensional unwrapping algorithm is applied to remove $2\pi$ ambiguities.

Under the assumption of a constant immersion medium thickness and refractive index around the sample, the optical thickness or optical-path-delay profile of the sample ($OPD_s$) can be extracted by subtracting all the elements having a constant refractive index and thickness, and written as follows:

$$OPD_s(x,y)=[\bar{n}_s(x,y)-n_m]\times h_s(x,y), \quad (2)$$

where $n_m$ is the constant refractive index of the immersion medium, $h_s$ is the thickness profile of the sample, and $\bar{n}_s$ is the sample integral refractive index which is defined as follows:

$$\bar{n}_s(x,y) = \frac{1}{h_s}\int_0^{h_s} n_s(x,y,z)\,dz. \quad (3)$$

To assess the capabilities of the off-axis interferometer of the present invention, measurements on several targets were performed and compared with the performances of a modified Mach-Zehnder interferometer, a common IPM setup [P. Girshovitz and N. T. Shaked, "Generalized cell morphological parameters based on interferometric phase microscopy and their application to cell life cycle characterization," Biomed. Opt. Express 3, 1757-1773 (2012).], when using both a high-coherence source (HeNe laser) and a low-coherence source with 6.7 nm spectral bandwidth. The comparative results are presented between the devices under the exact same conditions (where the devices operated using the same low-coherence light source, camera, optical table, etc.) The same fringe visibility area was chosen and the same reconstruction algorithms were applied in all cases.

The first measured sample was a new 600 lp/mm volume phase holographic grating (from Edmunds Optics). This grating is characterized by a constant physical thickness and a periodic refractive index with a constant amplitude and frequency. FIGS. 7A-7B are optical-path-delay or optical thickness maps of a volume phase holographic grating obtained under low-coherence illumination by the off-axis interferometer of the present invention; and a Mach-Zehnder interferometer respectively. FIGS. 7A-7B present the measurements done on the center of the grating using both the off-axis interferometer of the present invention and the Mach-Zehnder interferometer, both using the same low-coherence source. By comparing the results of both setups, it can be seen that both setups managed to recognize the periodic refractive index of the grating. However, the off-axis interferometer of the present invention provided a significantly clearer and more consistent image (see FIG. 7A) compared to the conventional Mach-Zehnder interferometer (see FIG. 7B), which yielded artifacts like brakes in the ridges and inconstant base plane.

Using FIB lithography, the inventors created several custom-made phase targets containing variable depths elements such as shapes on a chrome-plated glass cover-slip (10 nm plating) in different heights, ranging from 10 nm to 300 nm. The first element was a large plate-like shape with a curvature inside. Six smaller plate-like shapes were positioned symmetrically inside the large plate with a deeper curvatures and a logo was lithographed in the middle of the larger plate with a deeper milling as illustrated in FIG. 8.

Figures 9A, 9B, 9C:
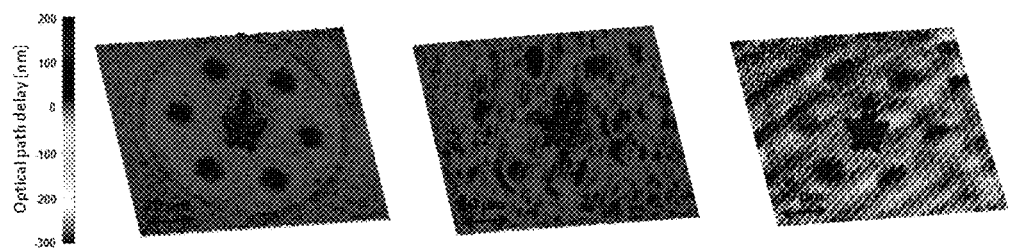
FIGS. 9A-9C are optical-path-delay maps of a first phase target created by Focused ion beam (FIB) lithography, containing variable depths elements, as obtained using: the off-axis interferometer of the present invention with a low-coherence source (FIG. 9A); an off-axis Mach-Zehnder interferometer with a low-coherence source (FIG. 9B); and an off-axis Mach-Zehnder interferometer with a high-coherence source (HeNe laser) (FIG. 9C) respectively.

Reference is made to FIGS. 9A-9C presenting optical-path-delay maps of the phase target of FIG. 8 as obtained by the off-axis interferometer of the present invention using a low-coherence source (FIG. 9A), by a Mach-Zehnder interferometer using a low-coherence source (FIG. 9B), and by a Mach-Zehnder interferometer using a high-coherence source (HeNe laser) (FIG. 9C). While the three configurations managed to record the logo in the center of the plate, the modified Mach-Zehnder interferometer failed in recording the large plate curvature, as well as could hardly visualized the smaller six plates around the logo, due to higher spatial noise level, which is even severer in the coherent setup (FIG. 9C), as expected. In FIG. 9C, the effects of the coherent noise and the self interferences of the high-coherence source distorted the thinnest elements, i.e. the six plates and larger plate.

Figures 10A, 10B, 10C:
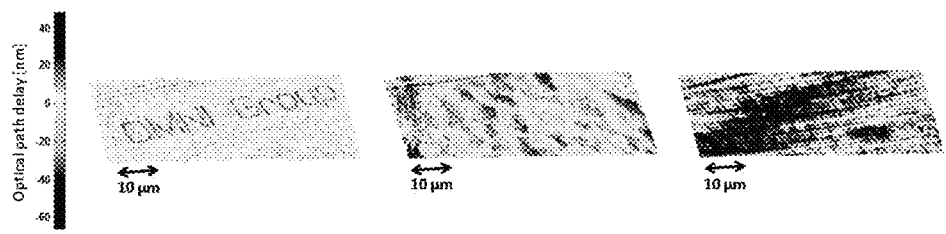
FIGS. 10A-10C are optical-path-delay maps of a second phase target created by FIB lithography, containing variable depths elements, as obtained using: the off-axis interferometer of the present invention with a low-coherence source (FIG. 10A); an off-axis Mach-Zehnder interferometer with a low-coherence source (FIG. 10B); and an off-axis Mach-Zehnder interferometer with a high-coherence source (HeNe laser) (FIG. 10C) respectively.

A second phase target containing variable depths elements, lithographed by the same FIB technique, contained the words "OMNI Group" with a line width of 0.7 μm (close to the microscope diffraction-limit spot) and an optical thickness of 20 nm (10 nm due to the milling of the chrome and 10 nm due to the milling of the glass). Again, three cases were compared: the off-axis τ interferometer using a low-coherence source, a Mach-Zehnder interferometer using a low-coherence source, and a Mach-Zehnder interferometer using a high-coherence source (HeNe laser). The corresponding optical-path-delay maps are shown in FIGS. 10A-10C. As it was for the first target of FIG. 5, the lower spatial noise level of the off-axis interferometer of the present invention enables it to see smaller features that the other conventional IPM setups cannot see. In FIG. 10A, the lithographed text "OMNI Group" is clearly seen and distinguished from the background, whereas in the measurements done by the modified Mach-Zehnder interferometer, presented in FIGS. 10B-10C, the background noise level conceals most of the lithographed text and only several lines are barely seen.

Figures 11A, 11B:
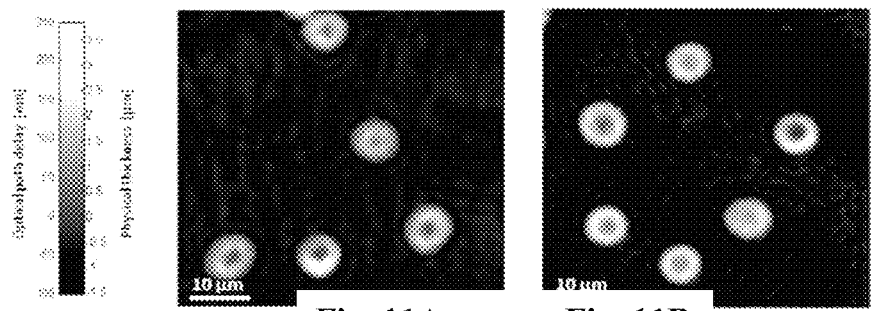
FIGS. 11A-11B are red blood cell (RBC) optical-path-delay and physical thickness maps obtained using a low-coherence source: the off-axis interferometer of the present invention (FIG. 11A); an off-axis Mach-Zehnder interferometer (FIG. 11B) respectively.

The mean optical-path-delay of the lithographed text letters in FIG. 10A is measured as 20 nm, which agrees with the real optical-path-delay of the letters that was calculated as 19.4 nm ($n_{chrome}$=2.42 and $n_{glass}$=1.515). It should be noted that minimal milling capability of the FIB setups used in the experiments is 10 nm, so it is possible that the inconstant optical-path-delay of the letters seen in FIG. 11A is caused by the milling process of the glass layer and not due to the spatial interferometric noise. In any case, these results show that the off-axis interferometer of the present invention can be used to perform inexpensive quality checks and imaging during the manufacturing of transparent optical elements, as long as the lateral dimensions of the smallest element that need to be examined is larger than the diffraction-limit spot of the microscope.

Figures 11C, 11D:
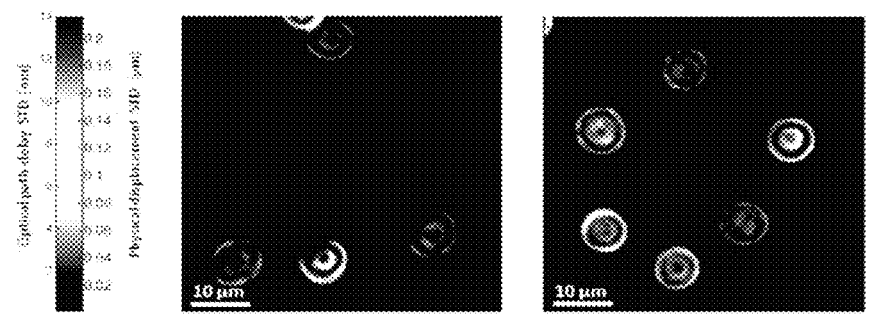
FIGS. 11C-11D are standard deviation of the optical-path-delay and of the physical thickness maps for: the off-axis interferometer of the present invention (FIG. 11C); and an off-axis Mach-Zehnder interferometer (FIG. 11D) respectively.

The inventors have also measured red blood cell (RBC) membrane fluctuations, where 300 frames at 25 frames per second were captured. FIGS. 11A-11D show the optical-path-delay and physical thickness profile of RBC sample from both setups while using a low-coherence source of the off-axis interferometer of the present invention and of the off-axis Mach-Zehnder interferometer (FIGS. 11A and 11B, respectively), and the corresponding temporal standard deviation maps of the off-axis interferometer of the present invention and of the off-axis Mach-Zehnder interferometer (FIGS. 11C and 11D, respectively). The bar in the left side of FIG. 11 is made to show both the optical-path-delay values and the physical thickness values based on the refractive indices assumption of 1.395 for the RBCs and 1.33 for the medium.

The optical-path-delay profiles show a slightly lower spatial noise level in the off-axis interferometer of the present invention (FIGS. 11A-11B, with more self-interferences in the bottom right side of FIG. 11B). It should be noted that none of the images have been digitally treated to improve its quality. The standard deviation calculated by using the Mach-Zehnder interferometer showed higher temporal noise levels with a mean background value of 1.1 nm, compared to only 0.32 nm in the off-axis interferometer of the present invention (FIGS. 11C-11D). The standard deviations of the RBC optical-path-delay fluctuations were similar for the two types of measurements, ranging from 0.7 nm to 7 nm [I. Shock, A. Barbul, P. Girshovitz, U. Nevo, R. Korenstein, and N. T. Shaked, "Optical phase measurements in red blood cells using low-coherence spectroscopy," J. Biomed. Opt. 17, 101509 (2012)]. It should be noted that not all of fluctuations were seen using the Mach-Zehnder interferometer, as in some cases the temporal noise level was higher than the lowest measurable optical-path-delay standard deviation.

Figure 12:
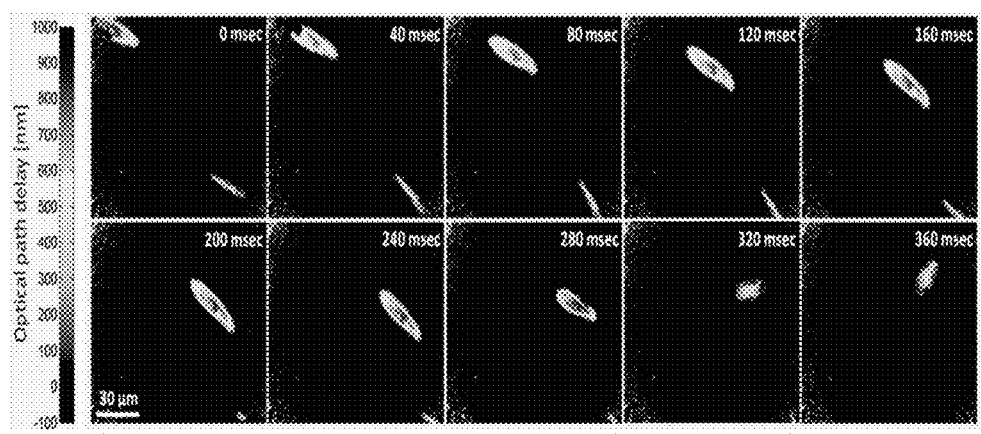
FIG. 12 are measurements of Blepharisma organism swimming in water using the off-axis interferometer of the present invention and demonstrating the device capabilities for quantitative imaging of fast dynamics on relatively large field of view due to its true off-axis configuration.

One of the advantages of the off-axis interferometer over the on-axis interferometer is the capability of recording dynamic changes in a large field of view, where the frame rate is limited only by the maximal frame rate of the camera sensor (since only one frame of acquisition is required to reconstruct the optical-path-delay map), and the field of view is only limited by the complex degree of coherence of the light source used and not by the optical system. FIG. 12 presents Blepharisma organism in motion using the off-axis interferometer of the present invention, as it swims through the entire field of view in water at a frame rate of 25 fps. The entire motion across the field of view lasted less than half a second, where there is not a point in time where the Blepharisma was stationery. As can be seen in FIG. 12, at 0 msec, 40 msec, 320 msec and at 360 msec, due to the low-coherence length of the light source, the reconstruction of the Blepharisma image is not complete. In the first two cases (0 and 40 msec), the lower coherence length causes a low visibility of the interference fringes in some areas at the edges of the frame. In these areas, the interference visibility is low and the phase cannot be well reconstructed. In the last two cases (320 and 360 msec), the Blepharisma is positioned in an angle to the imaging plane, which causes an erroneous reconstruction in these out-of-focus points, so not all parts of the organism can be reconstructed. These problems may be solved by using a coherent source as the coherence length will increase, however coherent noise will be higher while decreasing the device sensitivity [7]. This figure demonstrates the device capabilities for quantitative imaging of fast dynamics on relatively large field of view due to its true off-axis configuration.

In addition to the facts that the interferometer of the present invention is smaller, less expensive, more portable and significantly easier to construct and to align compared to the conventional off-axis IPM setups, the experimental results have shown that the off-axis interferometer of the present invention provides better and clearer optical-path-delay maps, with lower spatial and temporal noise.

The off-axis interferometer of the present invention is able to record a single interferogram containing more than 1 Mega pixels (an area of 5.32 mm×5.32 mm on our camera sensor), and due to its off-axis geometry, it allows multi-cells imaging in a single frame of acquisition. The temporal and spatial noises, determining the smallest dynamic change and the smallest optical path delay that may be detected by the setup, are in the sub-nanometer range with values less than 0.7 nm for the full image and less than 0.4 nm in the center of the image. The off-axis interferometer of the present invention have recorded objects with thicknesses of about 20 nm, which otherwise would be obscured by the spatial noise, as was demonstrated using FIB-lithographed elements, and have detected dynamic changes in the range of 10 nm.

In some embodiments, the device may comprise a diffraction grating configured for tilting the field in one of the beams to create a full-field, high-visibility interference on the entire camera plane [7].

The invention claimed is:

1. An interferometric device comprising a light directing optical arrangement for directing light to an optical detector, wherein the light directing optical arrangement is configured for defining first and second substantially overlapping optical paths towards said optical detector, the light directing optical arrangement comprising:

a beam splitter/combiner unit for receiving an input beam having an amplitude and phase modulation and splitting said input beam into first and second light beams;

first and second reflective surfaces accommodated in the first and second optical paths of said first and second light beams to direct said first and second light beams back to said beam splitter/combiner that directs the combined beam to the detector, wherein one of said first and second reflective surfaces comprises a retro-reflector configured and operable to reflect said first light beam and shift a Fourier plane center of the reflected light beam, so that an off-axis angle is created between said first and second light beams, wherein said retro-reflector is positioned in the Fourier plane of the reflected light beam; and a spatial filter comprising a pinhole accommodated in front of one of the first and second reflective surfaces and a Fourier optics assembly comprising two lenses, one lens being in a 4f configuration with respect to the other;

wherein the beam splitter/combiner unit directs one of the first and second light beams through said spatial filter to enable amplitude and phase demodulation thereof and formation of a reference beam with respect to the other modulated beam.

2. The interferometric device of claim 1, wherein said pinhole is located in a predetermined Fourier plane.

3. The interferometric device of claim 1, wherein said beam splitter/combiner unit comprises a cube beam splitter.

4. The interferometric device of claim 1, wherein said first and second reflective surfaces are placed at outputs of the beam splitter/combiner unit.

5. The interferometric device of claim 1, wherein one of said two lenses is located at its focal length from the detector.

6. The interferometric device of claim 1, wherein one of the first and second reflective surfaces is located after one of the two lenses at a distance of the focal length of the lens.

7. The interferometric device of claim 1, comprising a phase shifting device into in one of the optical paths.

* * * * *